(12) United States Patent
Teng et al.

(10) Patent No.: US 11,774,815 B2
(45) Date of Patent: Oct. 3, 2023

(54) DISPLAY PANEL AND DISPLAY DEVICE

(71) Applicant: Xiamen Tianma Micro-Electronics Co., Ltd., Fujian (CN)

(72) Inventors: Yongjin Teng, Fujian (CN); Xiaoli Liu, Fujian (CN); Limin Lin, Fujian (CN); Yingzhang Qiu, Fujian (CN); Jiao Gao, Fujian (CN); Tingxi Huang, Fujian (CN)

(73) Assignee: Xiamen Tianma Micro-Electronics Co., Ltd., Fujian (CN)

( * ) Notice: Subject to any disclaimer, the term of this patent is extended or adjusted under 35 U.S.C. 154(b) by 0 days.

(21) Appl. No.: 17/309,780

(22) PCT Filed: Aug. 31, 2020

(86) PCT No.: PCT/CN2020/112647
§ 371 (c)(1),
(2) Date: Jun. 18, 2021

(87) PCT Pub. No.: WO2022/000759
PCT Pub. Date: Jan. 6, 2022

(65) Prior Publication Data
US 2023/0122677 A1    Apr. 20, 2023

(30) Foreign Application Priority Data

Jun. 30, 2020    (CN) .......................... 202010622999.9

(51) Int. Cl.
*G02F 1/1362*    (2006.01)
*G02F 1/1335*    (2006.01)

(52) U.S. Cl.
CPC .. *G02F 1/136222* (2021.01); *G02F 1/133514* (2013.01); *G02F 1/136209* (2013.01); *G02F 1/136286* (2013.01)

(58) Field of Classification Search
None
See application file for complete search history.

(56) References Cited

U.S. PATENT DOCUMENTS 5,587,818 A    12/1996    Lee
8,107,047 B2 *    1/2012    Song .................. G02F 1/13394
                                                                  349/110

(Continued)

FOREIGN PATENT DOCUMENTS

CN    104375313 A    2/2015
CN    105116651 A    12/2015

(Continued)

OTHER PUBLICATIONS

ISR, PCT/CN202/112647, Mar. 25, 2021.

*Primary Examiner* — Richard H Kim
(74) *Attorney, Agent, or Firm* — Alston & Bird LLP

(57) ABSTRACT

Provided display panel includes color film substrate, array substrate disposed opposite to color film substrate, first color resist layer disposed on color film substrate and including first-type color resist blocks, second color resist layer disposed on array substrate, and first metal wires disposed on array substrate. Second color resist layer is disposed on side of first metal wires facing color film substrate. First metal wires extend along first direction. Second color resist layer includes second-type color resist blocks. Color of second-type color resist blocks different from color of first-type color resist blocks. Each first-type color resist block and each second-type color resist block are disposed alternatively along second direction. edge of first-type color resist block overlap edge of second-type color resist block adjacent to first-type color resist block, and overlapping regions between first-type color resist blocks and second-type color resist blocks adjacent to each other cover first metal wires.

20 Claims, 19 Drawing Sheets

(56) References Cited

U.S. PATENT DOCUMENTS

2003/0137615 A1    7/2003   Nakayoshi et al.
2018/0004036 A1*   1/2018   Hwang ............. G02F 1/134309

FOREIGN PATENT DOCUMENTS

| CN | 105652357 | A | 6/2016 |
|----|-----------|---|--------|
| CN | 106094317 | A | 11/2016 |
| CN | 107357078 | A | 11/2017 |
| JP | S63158524 | A | 7/1988 |

\* cited by examiner

DISPLAY PANEL AND DISPLAY DEVICE

CROSS-REFERENCE TO RELATED APPLICATION(S)

This is a national stage application filed under 37 U.S.C. 371 based on International Patent Application No. PCT/CN2020/112647, titled "DISPLAY PANEL AND DISPLAY DEVICE", filed Aug. 31, 2020, which claims priority to Chinese Patent Application No. 202010622999.9 filed with the CNIPA on Jun. 30, 2020, the disclosures of both are incorporated herein by reference in their entireties.

TECHNICAL FIELD

Embodiments of the present application relate to the field of display technology, for example, a display panel and a display device.

BACKGROUND

The continuous development of display technology has given rise to various new types of display panels. However, conventional liquid crystal display panels still play an important role in the display field by virtue of its mature technology, good display performance, and high stability.

A liquid crystal display panel includes a color film substrate and an array substrate that are disposed opposite to each other. To avoid light leakage at metal, a black matrix layer is disposed on the color film substrate to block metal wires on the array substrate. As the number of pixels per inch (PPI, i.e., pixel density, indicating a number of pixels contained per inch) of the display panel increases, a width of a black matrix needs to be reduced correspondingly, which increases the difficulty in preparing the black matrix and thus increases the difficulty in preparing the display panel. For example, when the liquid crystal display panel is used in a curved display, the black matrix on a side of the color film substrate may be misaligned with the metal wires on a side of the array substrate due to bending of the display panel, thus poor display is caused by the light leakage at metal. However, an increase in the width of the black matrix decreases a display aperture ratio.

SUMMARY

The present application provides a display panel and a display device to reduce the difficulty in preparing a high-PPI display panel under a premise that metal wires are ensured to be blocked effectively.

In a first aspect, embodiments of the present application provide a display panel. The display panel includes a color film substrate, an array substrate, a first color resist layer, a second color resist layer, and a plurality of first metal wires.

The color film substrate and the array substrate are disposed opposite to each other.

The first color resist layer is disposed on the color film substrate and includes a plurality of first-type color resist blocks.

The second color resist layer and the plurality of first metal wires are disposed on the array substrate. The second color resist layer is disposed on a side of the plurality of first metal wires facing the color film layer. The plurality of first metal wires extend along a first direction. The second color resist layer includes a plurality of second-type color resist blocks. A color of the plurality of second-type color resist blocks is different from a color of the plurality of first-type color resist blocks. Each first-type color resist block of the plurality of first-type color resist blocks and each second-type color resist block of the plurality of second-type color resist blocks are disposed alternatively along a second direction. An edge of the each first-type color resist block overlaps an edge of the each second-type color resist block that is adjacent to the each first-type color resist block. Overlapping regions between the plurality of first-type color resist block and the plurality of second-type color resist block that are adjacent to each other covers the plurality of first metal wires.

The first direction is an extension direction of a bend axis of the display panel. The second direction is perpendicular to the first direction.

In a second aspect, embodiments of the present application further provide a display device. The display device includes the display panel in the preceding first aspect.

DETAILED DESCRIPTION

Figure 1:
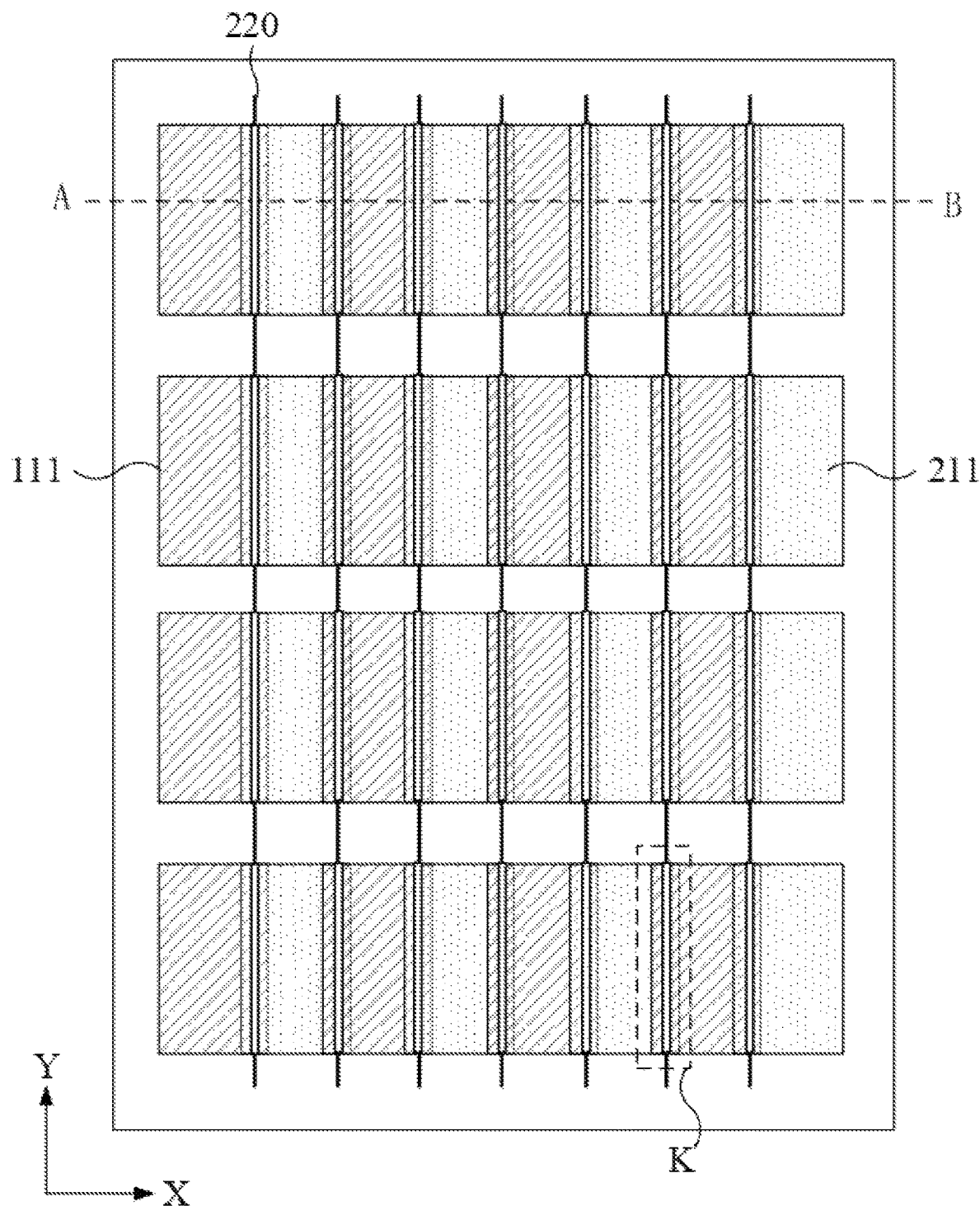
FIG. 1 is a top view illustrating a structure of a display panel according to an embodiment of the present application.

Embodiments of the present application provide a display panel. The display panel includes a color film substrate, an array substrate, a first color resist layer, a second color resist layer, and a plurality of metal wires.

The color film substrate and the array substrate are disposed opposite to each other.

The first color resist layer is disposed on the color film substrate and includes a plurality of first-type color resist blocks.

The second color resist layer and the plurality of first metal wires are disposed on the array substrate. The second color resist layer is disposed on a side of the plurality of first metal wires facing the color film layer. The plurality of first metal wires extend along a first direction. The second color resist layer includes a plurality of second-type color resist blocks. The color of the plurality of second-type color resist blocks is different from the color of the plurality of first-type color resist blocks. Each first-type color resist block of the plurality of first-type color resist blocks and each second-type color resist block of the plurality of second-type color resist blocks are disposed alternatively along a second direction. an edge of the each first-type color resist block overlaps an edge of the each second-type color resist block that is adjacent to the each first-type color resist block, overlapping regions between the plurality of first-type color resist blocks and the plurality of second-type color resist blocks that are adjacent to each other cover the plurality of metal wires.

The first direction is an extension direction of a bend axis of the display panel. The second direction is perpendicular to the first direction.

In the technical solutions provided in embodiments of the present application, the color film substrate includes the first color resist layer. The array substrate includes the second color resist layer. The first color resist layer includes a plurality of first-type color resist blocks. The second color resist layer includes a plurality of second-type color resist blocks. The color of the plurality of second-type color resist blocks is different from the color of the plurality of first-type color resist blocks. Each first-type color resist block of the plurality of first-type color resist blocks and each second-type color resist block of the plurality of second-type color resist blocks are disposed alternatively along a second direction. An edge of a first-type color resist block overlaps an edge of a second-type color resist block that is adjacent to the first-type color resist block. Overlapping regions between the first-type color resist blocks and the second-type color resist blocks that are adjacent to each other cover the plurality of first metal wires on a side of the second color resist layer facing away from the color film substrate. With this arrangement, on one hand, the overlapping regions between the plurality of first-type color resist blocks and the plurality of second-type color resist blocks that both have the light-blocking effect cover the plurality of first metal wires, thus avoiding the light leakage at metal. On the other hand, the widths of the overlapping regions between the plurality of first-type color resist blocks and the plurality of second-type color resist blocks can be adjusted by setting relative positions of the plurality of first-type color resist blocks and the plurality of second-type color resist blocks, thus preventing the width reduction of an light-blocking structure (the light-blocking structure are made up of the plurality of first-type color resist blocks and the plurality of second color resist blocks) of the metal wires in a high-PPI display panel from increasing the difficulty in preparing the display panel. For example, the light leakage at metal is avoided when the display panel is bent. Moreover, the color resist layers disposed in a layered manner enable a thickness of the overlapping regions between the color resist blocks to reach a design value, thus ensuring a good light-blocking effect.

The present application is described in detail in conjunction with the drawings. In the detailed description of embodiments of the present application, for ease of description, schematic views illustrating structures of devices and components are not partially enlarged to a general proportional scale. The schematic views are merely illustrative and are not intended to limit the scope of the present application. Additionally, in practical manufacturing, a three-dimensional spatial size includes: a length, a width, and a height.

Figure 2:
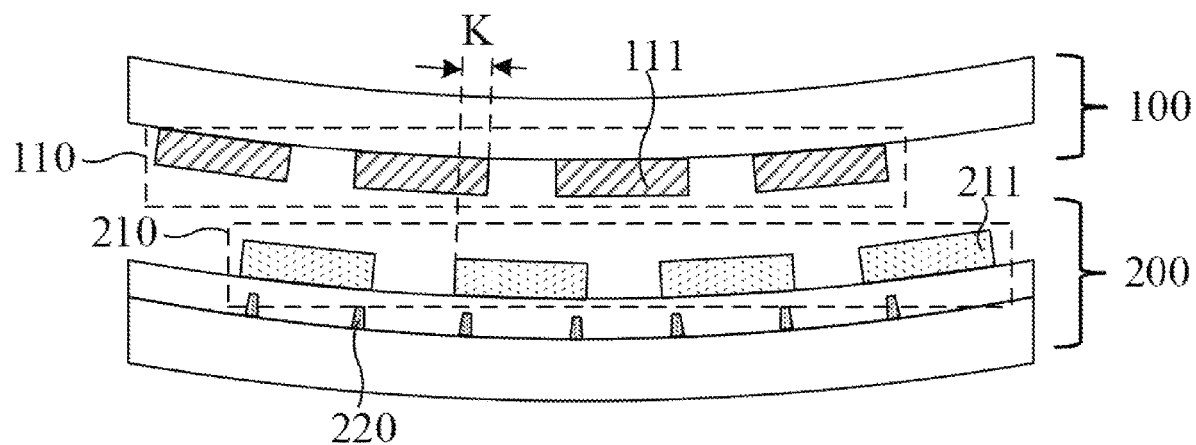
FIG. 2 is a section view taken along dashed line AB of FIG. 1.

FIG. 1 is a top view illustrating a structure of a display panel according to an embodiment of the present application. FIG. 2 is a section view taken along dashed line AB of FIG. 1. As shown in FIGS. 1 and 2, the display panel is shown as including, in part, a color film substrate 100, an array substrate 200, a first color resist layer 110, a second color resist layer 210, and a plurality of first metal wires 220. The color film substrate 100 and the array substrate 200 are disposed opposite to each other. The first color resist layer 110 is disposed on the color film substrate 100. The second color resist layer 210 and the plurality of first metal wires 220 are disposed on the array substrate 200. The first color resist layer 110 includes a plurality of first-type color resist blocks 111. The second color resist layer 210 is disposed on a side of the plurality of first metal wires 220 facing the color film substrate 100. The plurality of first metal wires 220 extend along a first direction Y. The second color resist layer includes a plurality of second-type color resist blocks 211. A color of the plurality of second-type color resist blocks 211 is different from a color of the plurality of first-type color resist blocks 111. Each first-type color resist block 111 of the plurality of first-type color resist blocks 111 and each second-type color resist block 211 of the plurality of second-type color resist blocks 211 are disposed alternatively along a second direction X. An edge of a first-type color resist block 111 overlaps an edge of a second-type color resist block 211 adjacent to the first-type color resist block 111. Overlapping regions K between the first-type color resist block 111 and the second-type color resist block 211 that are adjacent to each other cover the plurality of first metal wires 220. The first direction Y is an extension direction of the bend axis of the display panel. The second direction X is perpendicular to the first direction Y.

For example, the display panel is a curved display panel. A bending direction of the display panel, for example, may be toward a side facing the color film substrate 100, as shown in FIG. 2.

It is to be noted that the overlapping region K between a first-type color resist block 111 and a second-type color resist block 211 with a color different from that of the first-type color resist block 111, has a function of light blocking and prevent the first metal wire 220 covered by the overlapping regions K from leaking light at metal. In this embodiment, a color of the first-type color resist block 111 and a color of the second-type color resist block 211 are not limited as long as the overlapping region K between the two have a good light-blocking effect. Additionally, the plurality of first-type color resist blocks 111 may include color resist blocks with various colors. The plurality of second-type color resist blocks 211 may also include color resist blocks with various colors. Any solution in which a first-type color resist block 111 and a second-type color resist block 211 are adjacent and have different colors falls within the protection scope of this embodiment.

It is to be noted that the plurality of first-type color resist blocks 111 and the plurality of second-type color resist blocks 211 are disposed on the color film substrate 100 and array substrate 200 respectively, where the color film substrate 100 and the array substrate 200 are spaced-apart. In the preparation of the display panel, when the planar arrangement is converted into a bent arrangement, an apparent relative displacement occurs between a first-type color resist block 111 and a second-type color resist block 211 which are adjacent. Widths of part of the overlapping regions K are increased. The first metal wires 220 covered by such overlapping regions K would be always not exposed during the bending process of the display panel, thus effectively avoiding the light leakage at metal which is easily occurred during the bending process of the display panel.

Additionally, the display panel includes a plurality of sub-pixels. The sub-pixels are in one-to-one correspondence with color resist blocks. An aperture region of a sub-pixel is the part of the corresponding color resist block excluding an overlapping region K.

According to the technical solutions provided in this embodiment, the color film substrate 100 includes the first color resist layer 110. The array substrate 200 includes the second color resist layer 210. The first color resist layer 110 includes a plurality of first-type color resist blocks 111. The second color resist layer 210 includes a plurality of second-type color resist blocks 211. A color of the plurality of second-type color resist blocks 211 is different from a color of the plurality of first-type color resist blocks 111. Each first-type color resist block 111 of the plurality of first-type color resist blocks 111 and each second-type color resist block 211 of the plurality of second-type color resist blocks 211 are disposed alternatively along the second direction X. An edge of a first-type color resist block 111 overlaps an edge of a second-type color resist block 211 adjacent to the first-type color resist block 111. Overlapping regions K between the first-type color resist blocks 111 and the second-type color resist blocks 211 that are adjacent to each other cover the plurality of first metal wires 220 disposed on a side of the second color resist layer 210 facing away from the color film substrate 100. With this arrangement, on one hand, the overlapping regions K between the plurality of first-type color resist blocks 111 and the plurality of second-type color resist blocks 211 that both have the light-blocking effect cover the plurality of first metal wires 220, thus avoiding the light leakage at metal. On the other hand, the widths of the overlapping regions K between the plurality of first-type color resist blocks 111 and the plurality of second-type color resist blocks 211 can be adjusted by setting the relative positions of the plurality of first-type color resist blocks 111 and the plurality of second-type color resist blocks 211, thus preventing the width reduction of light-blocking structures of the metal wires in the high-PPI display panel from increasing the difficulty in preparing the display panel.

Figure 3:
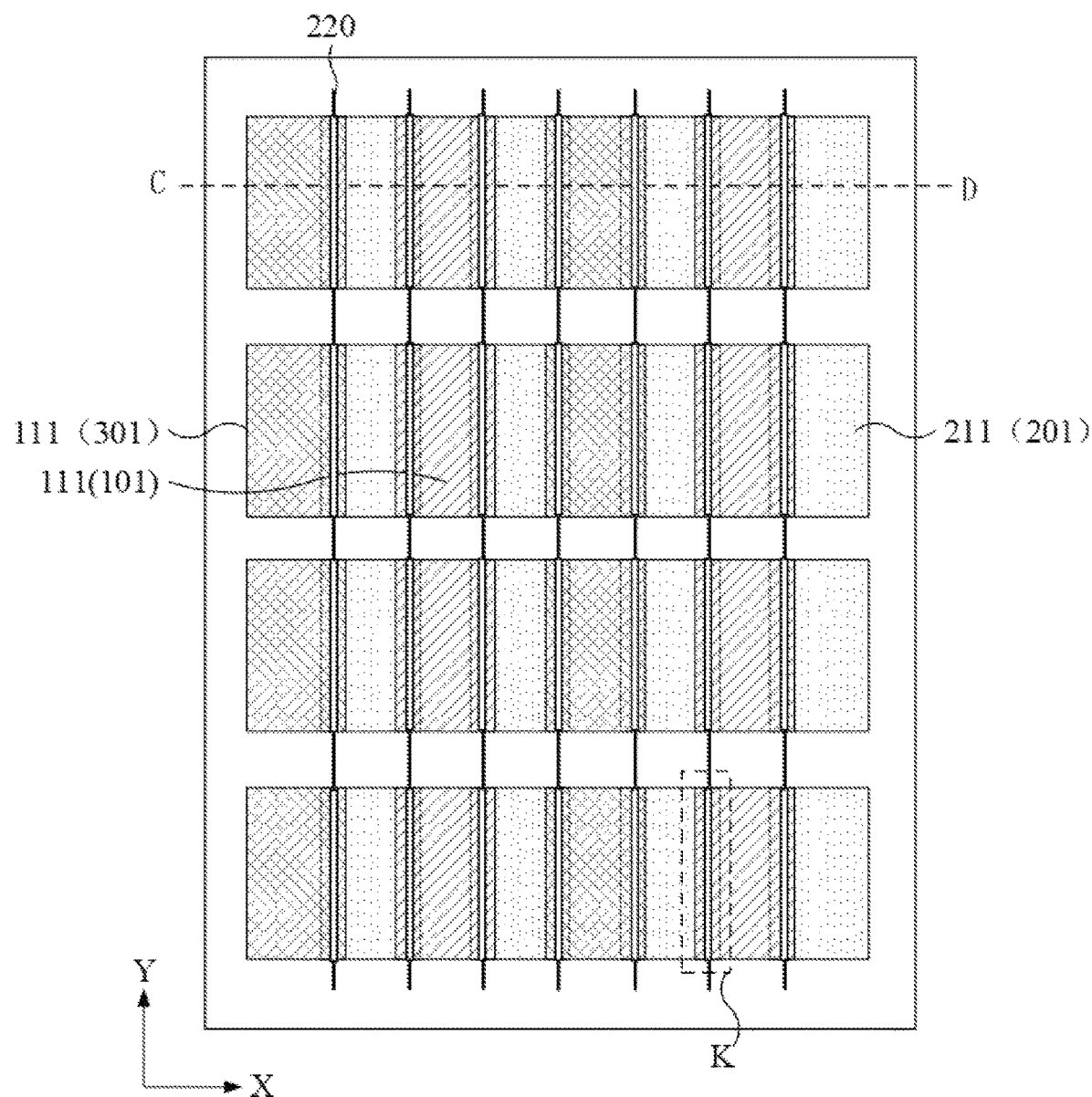
FIG. 3 is a top view illustrating a structure of another display panel according to an embodiment of the present application.
Figure 4:
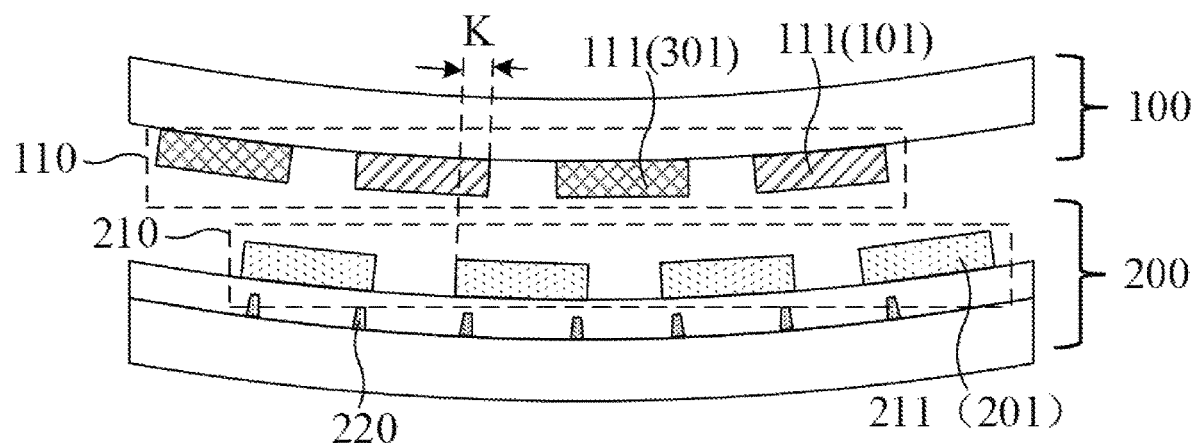
FIG. 4 is a section view taken along dashed line CD of FIG. 3.

FIG. 3 is a top view illustrating a structure of another display panel according to an embodiment of the present application. FIG. 4 is a section view taken along dashed line CD of FIG. 3. As shown in FIGS. 3 and 4, based on FIGS. 1 and 2, the plurality of first-type color resist blocks 111 include first color resist blocks 101 and third color resist blocks 301. The plurality of second-type color resist blocks 211 include second color resist blocks 201. The color of the plurality of first color resist blocks 101, the color of the plurality of second color resist blocks 102, and the color of the plurality of third color resist blocks 301 are each any one of red, green, or blue and are different from each other.

Figure 5:
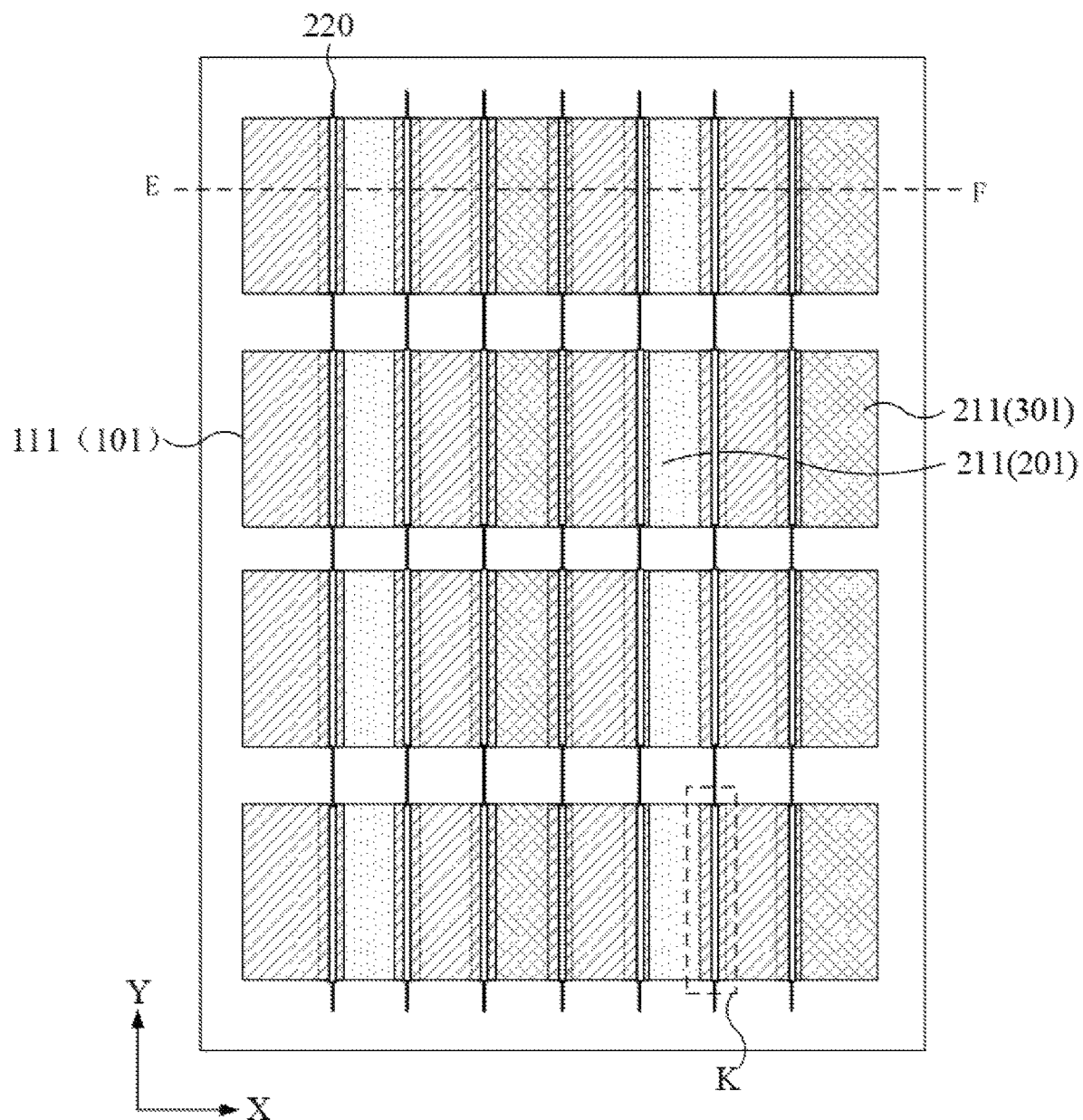
FIG. 5 is a top view illustrating a structure of a display panel according to another embodiment of the present application.
Figure 6:
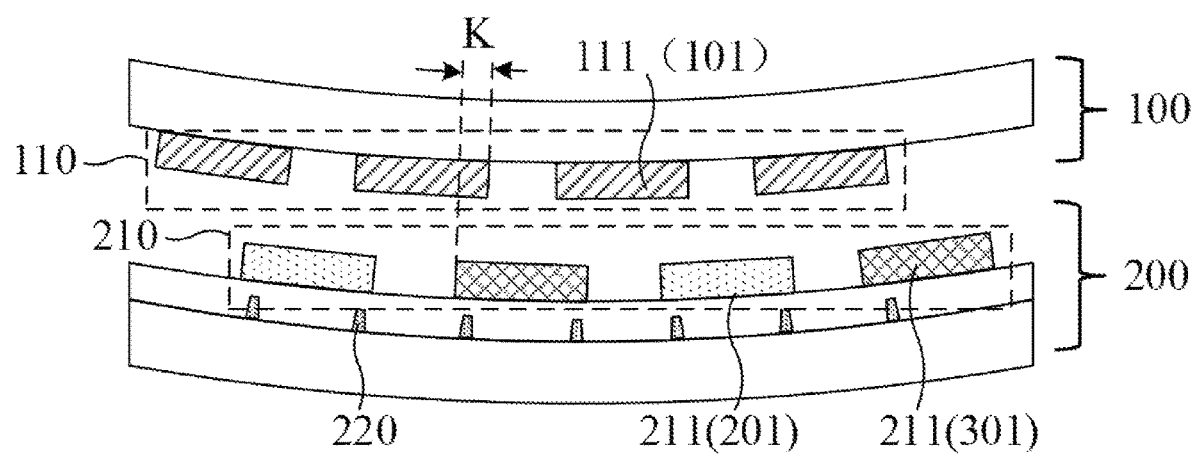
FIG. 6 is a section view taken along dashed line EF of FIG. 5.

FIG. 5 is a top view illustrating a structure of a display panel according to another embodiment of the present application. FIG. 6 is a section view taken along dashed line EF of FIG. 5. As shown in FIGS. 5 and 6, based on FIGS. 1 and 2, the plurality of first-type color resist blocks 111 include first color resist blocks 101. The plurality of second-type color resist blocks 211 include second color resist blocks 201 and third color resist blocks 301. The color of the first color resist blocks 101, the color of the second color resist blocks 102, and the color of the third color resist blocks 301 are each any one of red, green, or blue and are different from each other.

It is to be noted that red, green, and blue are three primary colors of light. Light of various colors can be obtained by mixing red, green, and blue that are of different intensities. Accordingly, the display panel is configured to include red color resist blocks, green color resist blocks, and blue color resist blocks. That is, the display panel includes red sub-pixels, green sub-pixels, and blue sub-pixels, thus diversifying and enriching the display colors of the display panel.

In an embodiment, the color of the first color resist blocks 101 and the color of the second color resist blocks 201 are each either red or blue and are different from each other.

It is to be noted that, as for the two types of display panels illustrated in FIGS. 3 to 6, the plurality of first color resist blocks 101 and the plurality of second color resist blocks 201 are disposed on the color film substrate 100 and the array substrate 200 respectively. The overlapping regions K between the plurality of first-type color resist blocks 111 and the plurality of second-type color resist blocks 211 adjacent to the plurality of first-type color resist blocks 111 necessarily includes the overlapping regions between the first color resist blocks 101 and the second color resist blocks 201. The overlapping regions between the color resist blocks of any two colors of red, green, and blue have different light blocking effects, where an overlapping region between a red color resist block and a blue color resist block has the best light blocking effect. Accordingly, the color of the plurality of first color resist blocks 101 and the color of the plurality of second color resist blocks 201 are set to blue and red respectively, or, alternatively, the color of the plurality of first color resist blocks 101 and the color of the plurality of second color resist blocks 201 are set to red and blue respectively. This arrangement helps enhance the light-blocking effect of the overlapping regions between the plurality of first color resist blocks 101 and the plurality of second color resist blocks 201, thus enhancing the overall light-blocking effect of the overlapping regions K between the plurality of first-type color resist blocks 111 and the plurality of second-type color resist blocks 211 adjacent to the plurality of first-type color resist blocks 111.

Figure 7:
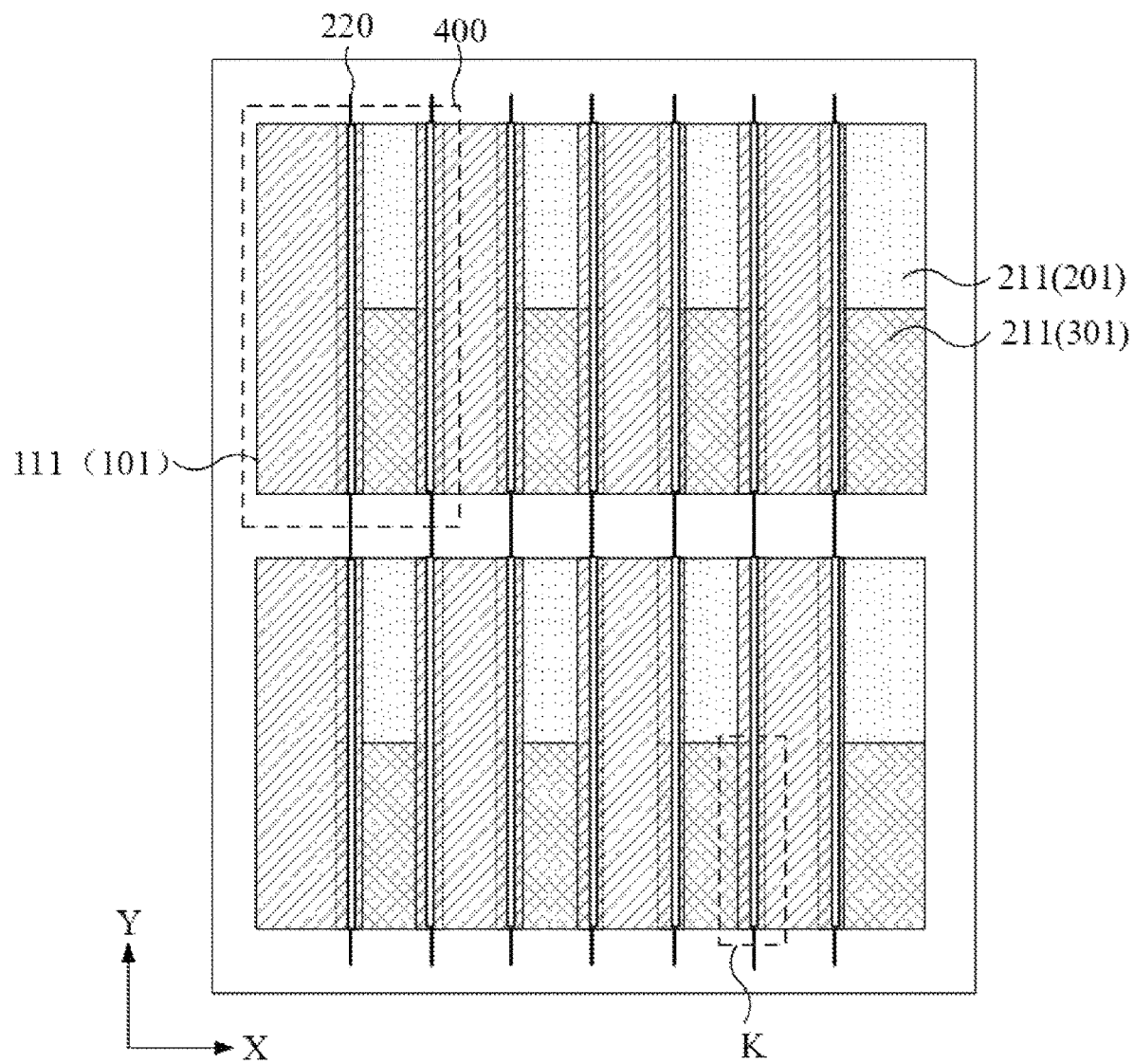
FIG. 7 is a top view illustrating a structure of a display panel according to another embodiment of the present application.

FIG. 7 is a top view illustrating a structure of a display panel according to another embodiment of the present application. The display panel illustrated in FIG. 7 is similar to the display panel illustrated in FIG. 5. The difference lies in that, as shown in FIG. 7, the plurality of first color resist blocks 101, the plurality of second color resist blocks 201, and the plurality of third color resist blocks 301 form a plurality of color resist groups 400 that are arranged in a first matrix. The row direction of the first matrix is same as the second direction X. The column direction of the first matrix is same as the first direction Y. Each color resist group 400 includes one first color resist block 101, one second color resist block 201, and one third color resist block 301. The second color resist block 201 and the third color resist block 301 are disposed along the first direction Y. Along the second direction X, the first color resist block 101 is disposed on a side of the second color resist block 201 and the third color resist block 301.

It is to be noted that the first color resist block 101, the second color resist block 201, and the third color resist block 303 with different colors in a color resist group 400 are disposed in a triangular manner, facilitating a color mixing among respective sub-pixels with different light-emitting colors and corresponding to the first color resist block 101, the second color resist block 201, and the third color resist block 303, which avoids an occurrence of a color cast, and enhances the display effect of the display panel.

For example, the sub-pixels corresponding to the color resist blocks of a same color in a same column are electrically connected to a same data line. For example, in FIG. 7, the sub-pixels corresponding to the two third color resist blocks 301 in the second column from the left are electrically connected to the same data line. This arrangement enables a number of data lines in the display panel to be the same as a number of data lines in a conventional arrangement in the related art, thus preventing an increase in the number of data lines from increasing the wiring difficulty of the display panel. The display panel includes a plurality of pixel units disposed in a matrix. A pixel unit includes three sub-pixels with different colors disposed in sequence along the row direction of the matrix. For example, the display panel includes a switch element layer. The switch element layer includes a plurality of thin-film transistors. The sub-pixels include pixel electrodes. The pixel electrodes are electrically connected to drains of the thin-film transistors in a one-to-one manner. Sources of the thin-film transistors are electrically connected to the data lines to implement the electrical connection between the sub-pixels and the corresponding data lines.

Figure 8:
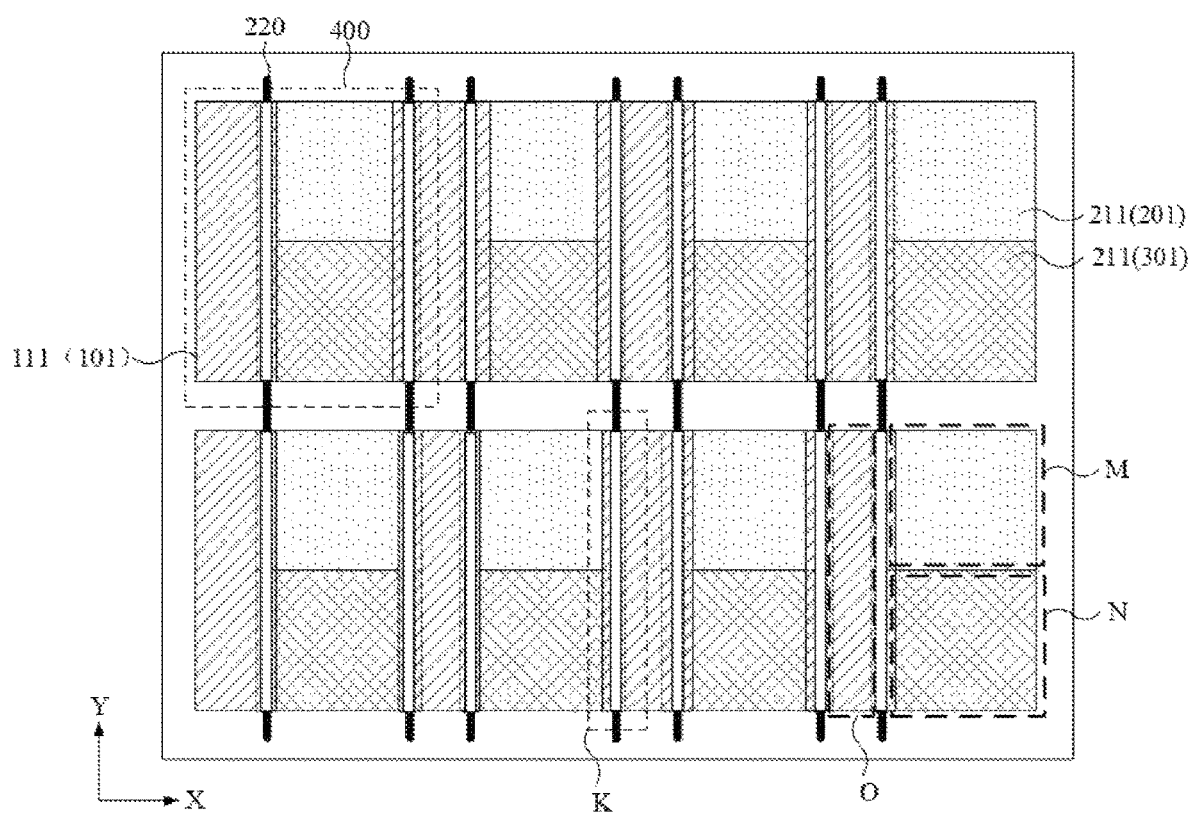
FIG. 8 is a top view illustrating a structure of a display panel according to another embodiment of the present application.

FIG. 8 is a top view illustrating a structure of a display panel according to another embodiment of the present application. The display panel illustrated in FIG. 8 is similar to the display panel illustrated in FIG. 7. The difference lies in that in FIG. 8, in a color resist group 400, an area of an aperture region of the first color resist block 101, an area of an aperture region of the second color resist block 201, and an area of an aperture region of the third color resist block 301 are equal.

It is to be noted that the aperture region of the color resist block overlaps an aperture region of a corresponding sub-pixel. For example, as shown in FIG. 8, the area of the aperture region O of the first color resist block 101, the area of the aperture region M of the second color resist block 201, and the area of the aperture region N of the third color resist block 301 are equal. For example, in the first direction Y, a length of the aperture region O is either twice of a length of the aperture region N or twice of a length of the aperture region M. In the second direction X, a length of the aperture region O is either half of a length of the aperture region N or half of a length of the aperture region M.

In this embodiment, the sub-pixels corresponding to the color resist blocks in one color resist group 400 form one pixel unit (the smallest unit for full-color display). In a case where the area of O=the area of M=the area of N, an area of the aperture region of each sub-pixel in the pixel unit are equal to each other. With this arrangement, a luminance difference caused by different areas of the aperture regions of sub-pixels with different light-emitting colors needs no consideration in luminance design, and thus the difficulty of luminance design is reduced.

Figure 9:
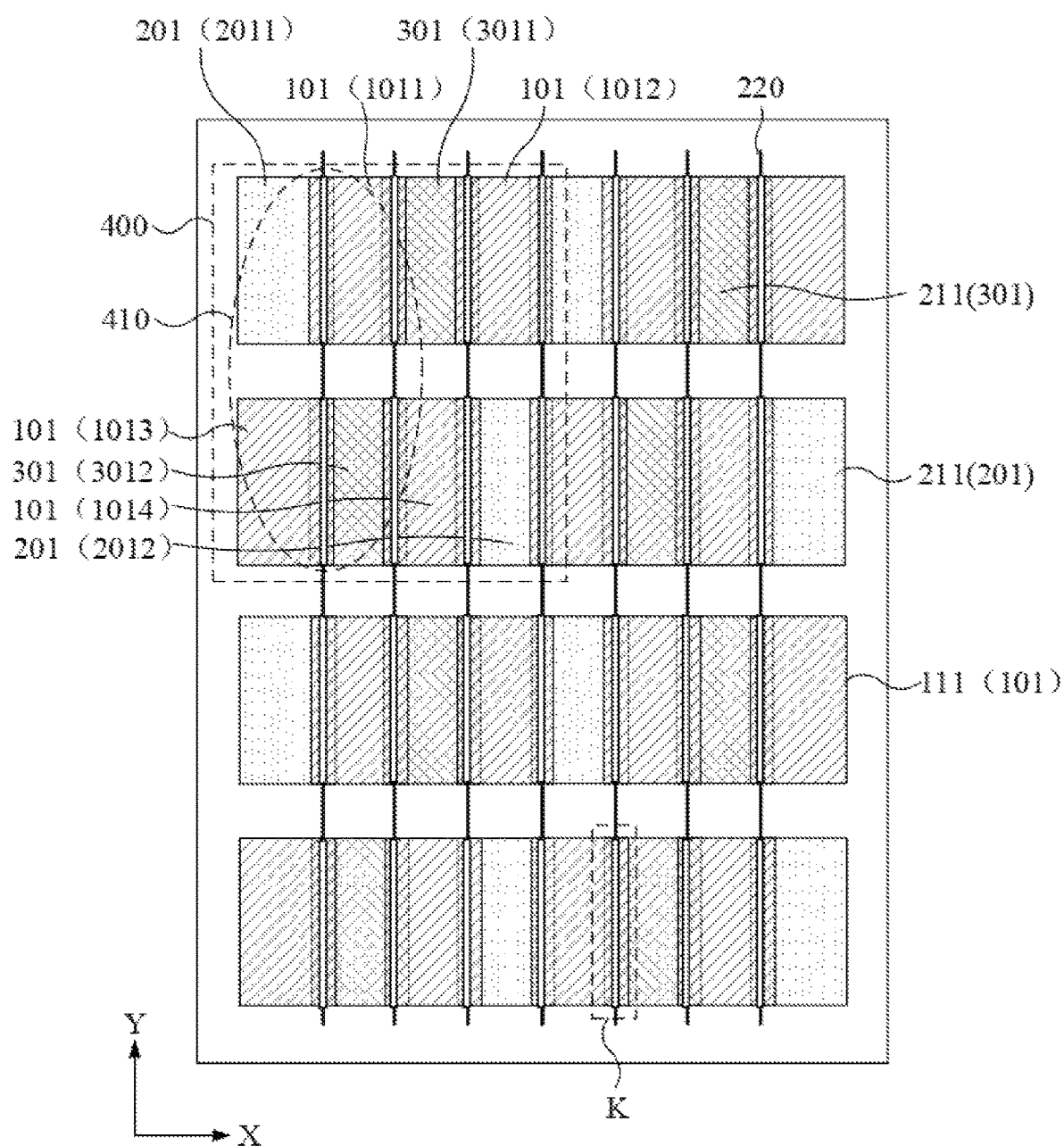
FIG. 9 is a top view illustrating a structure of a display panel according to another embodiment of the present application.

FIG. 9 is a top view illustrating a structure of a display panel according to another embodiment of the present application. The display panel illustrated in FIG. 9 is similar to the display panel illustrated in FIG. 5. The difference lies in that, as shown in FIG. 9, the plurality of first color resist blocks 101, the plurality of second color resist blocks 201, and the plurality of third color resist blocks 301 form a plurality of color resist groups 400 that are arranged in a second matrix. Each color resist group 400 includes four first color resist blocks 101, two second color resist blocks 201, and two third color resist blocks 301. The four first color resist blocks 101, the two second color resist blocks 201, and the two third color resist blocks 301 are disposed in a third matrix. A row direction of the second matrix and a row direction of the third matrix are both same as the second direction X. A column direction of the second matrix and a column direction of the third matrix are both same as the first direction Y.

The four first color resist blocks 101 include a first block 1011 of first color resist block, a second block 1012 of first color resist block, a third block 1013 of first color resist block, and a fourth block 1014 of first color resist block. The two second color resist blocks 201 include a first block 2011 of second color resist block and a second block 2012 of second color resist block. The two third color resist blocks 301 include a first block 3011 of third color resist block and a second block 3012 of third color resist block. In a first row of the third matrix, the first block 2011 of second color resist block, the first block 1011 of first color resist block, the first block 3011 of third color resist block, and the second block 1012 of first color resist block are disposed in sequence. In a second row of the third matrix, the third block 1013 of first color resist block, the second block 3012 of third color resist block, the fourth block 1014 of first color resist block, and the second block 2012 of second color resist block are disposed in sequence.

It is to be noted that, in the array substrate illustrated in FIG. 9, the color resist blocks with a same color in adjacent rows are staggered, facilitating the color mixing between the respective sub-pixels with different light-emitting colors and corresponding to the color resist blocks with a same color in adjacent rows, and thus enhancing the display effect of the display panel.

Additionally, a color resist group 400 includes two color resist subgroups 410 disposed along the second direction X. The sub-pixels corresponding to the color resist subgroups 410 form a pixel unit (the smallest unit for full-color display). For example, the two first color resist blocks 101 in a color resist subgroup 410 may share one data line. This arrangement enables the number of data lines in the display panel to be same as the number of data lines in the conventional pixel arrangement in the related art, thus avoiding an increase in the wiring difficulty. In the conventional pixel arrangement, the display panel includes a plurality of pixel units disposed in a matrix, and a pixel unit includes three sub-pixels with different colors disposed in sequence along a row direction of the matrix.

Figure 10:
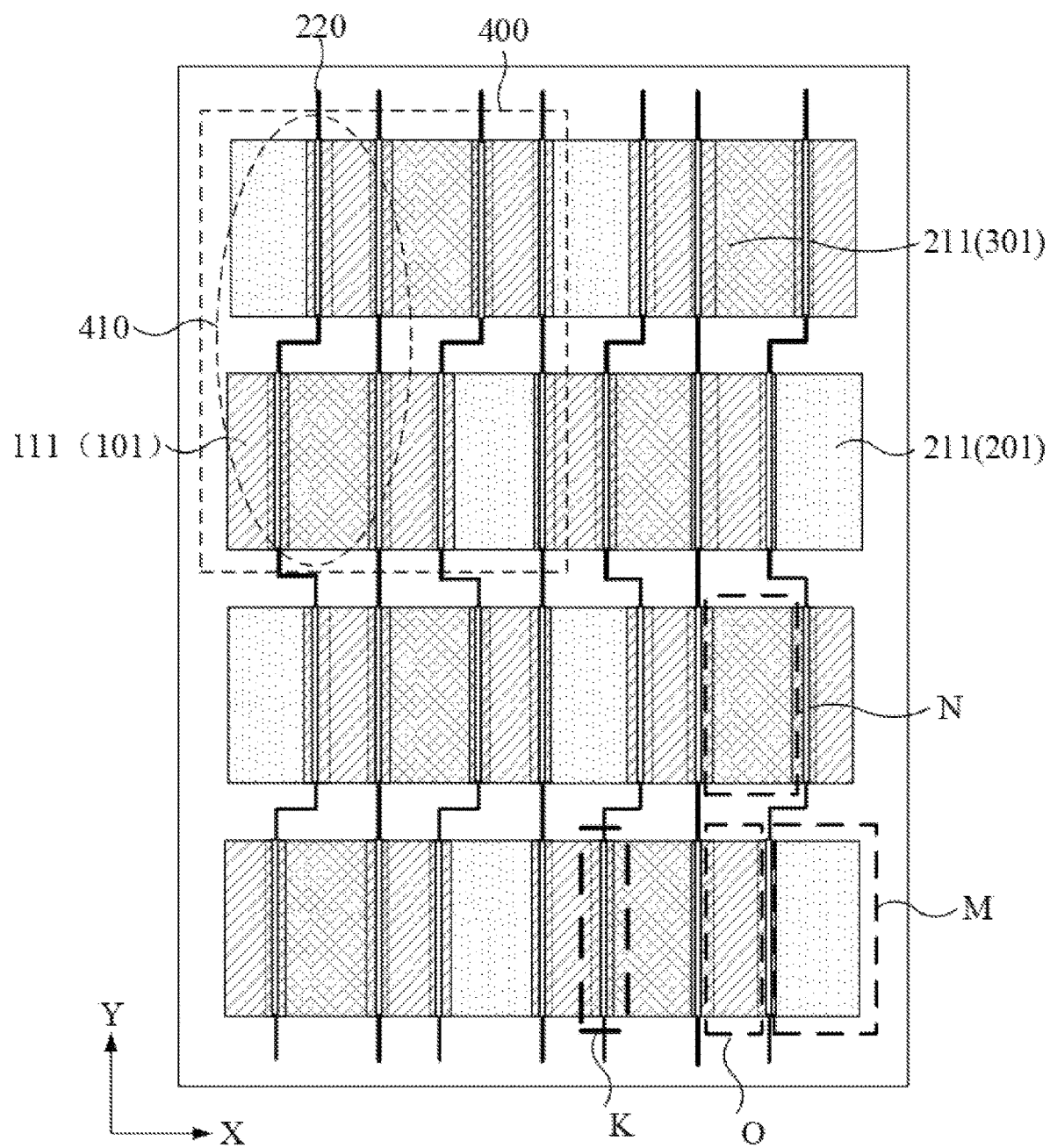
FIG. 10 is a top view illustrating a structure of a display panel according to another embodiment of the present application.

FIG. 10 is a top view illustrating a structure of a display panel according to another embodiment of the present application. The display panel illustrated in FIG. 10 is similar to the display panel illustrated in FIG. 9. The difference lies in that in FIG. 10, the area of the aperture region M of the second color resist block 201 and the area of the aperture region N of the third color resist block 301 are both A, while the area of the aperture region O of the first color resist block 101 is A/2.

For example, as shown in FIG. 10, in the first direction Y, the length of the first color resist block 101, the length of the second color resist block 201, and the length of the third color resist block 301 are equal, while in the second direction X, the width of the first color resist block 101 is either half of the width of the second color resist block 201 or half of the width of the third color resist block 301.

In this embodiment, in a color resist subgroup 410, the areas of the aperture regions of the three color resist blocks with different colors are equal. Accordingly, the areas of the aperture regions of the sub-pixels with different light-emitting colors in the corresponding pixel unit are equal, preventing different areas of the aperture regions of the sub-pixels from increasing complexity in luminance design.

Figure 11:
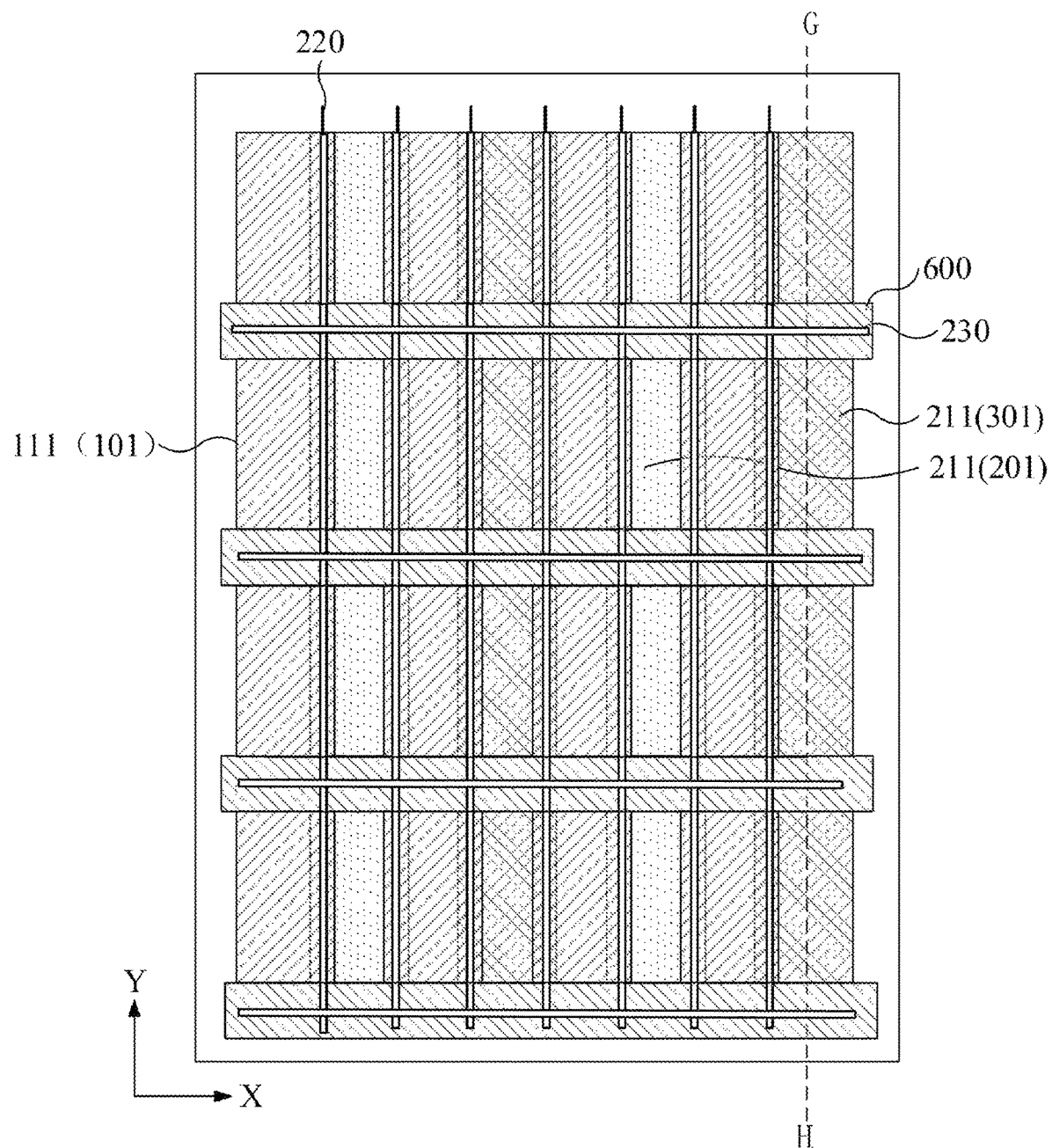
FIG. 11 is a top view illustrating a structure of a display panel according to another embodiment of the present application.
Figure 12:
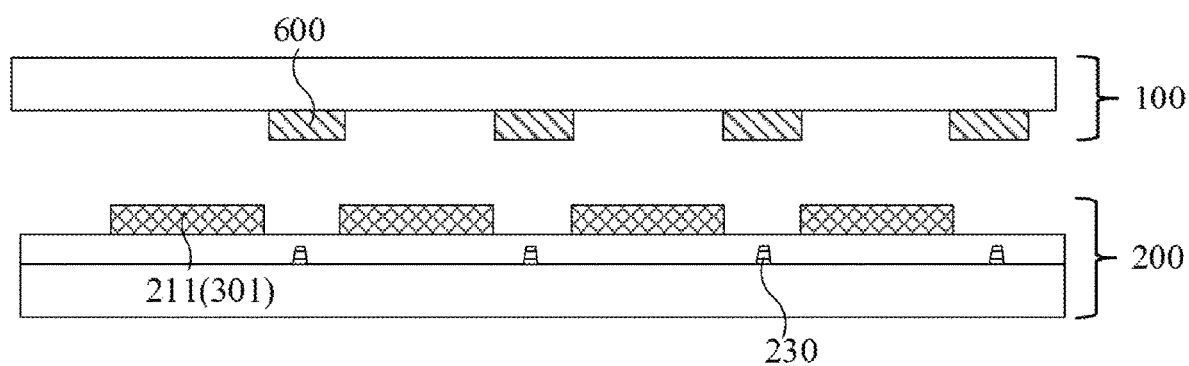
FIG. 12 is a section view taken along dashed line GH of FIG. 11.

FIG. 11 is a top view illustrating a structure of a display panel according to another embodiment of the present application. FIG. 12 is a section view taken along dashed line GH of FIG. 11. As shown in FIGS. 11 and 12, a plurality of second metal wires 230 are disposed on the array substrate 200. A black matrix layer 600 is disposed on the color film substrate 100. The second metal wires 230 extend along the second direction X. The black matrix layer 600 covers the second metal wires 230.

It is to be understood that a shape of the black matrix layer 600 is limited to being able to cover the second metal wires 230 and is disposed appropriately according to positions of the second metal wires 230 and a distribution of the second metal wires 230. The black matrix layer 600, for example, may include a plurality of strip structures, as shown in FIG. 11.

It is to be noted that the arrangement of the black matrix layer 600 prevents the second metal wires 230 from leaking light leakage at metal and guarantees a good display effect of the display panel.

Figure 13:
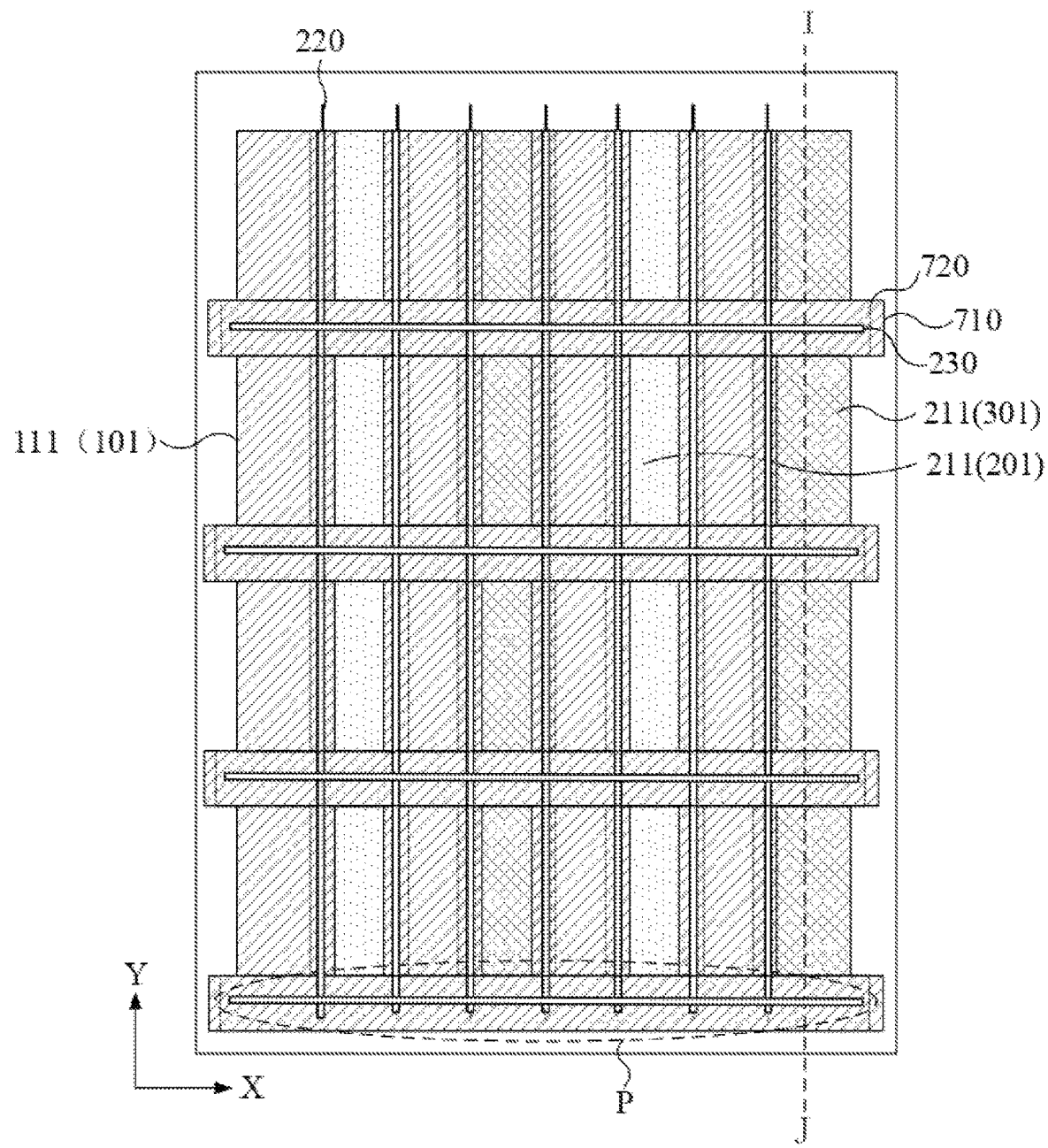
FIG. 13 is a top view illustrating a structure of a display panel according to another embodiment of the present application.
Figure 14:
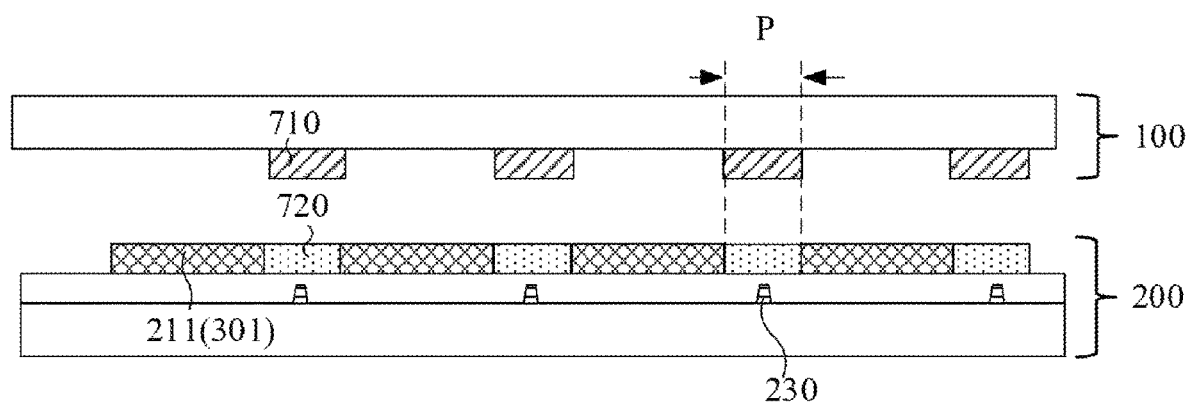
FIG. 14 is a section view taken along dashed line IJ of FIG. 13.

In another embodiment, FIG. 13 is a top view illustrating a structure of a display panel according to another embodiment of the present application. FIG. 14 is a section view taken along dashed line IJ of FIG. 13. As shown in FIGS. 13 and 14, the second metal wires 230 are disposed on the array substrate 200. A first color resist sub-layer 710 is disposed in the first color resist layer 110, and a second color resist sub-layer 720 is disposed in the second color resist layer 200. The second metal wires 230 extend along the second direction X. The color of the first color resist sub-layer 710 is different from the color of the second color resist sub-layer 720. An overlapping region P between the first color resist sub-layer 710 and the second color resist sub-layer 720 covers the second metal wires 230.

In this embodiment, shapes and relative sizes of the first color resist sub-layer 710 and the second color resist sub-layer 720 are not limited. Any solution in which an overlapping region between the first color resist sub-layer 710 and the second color resist sub-layer 720 can completely cover shapes of the second metal wires 230 falls within the protection scope of this embodiment. For example, the first color resist sub-layer 710 and the second color resist sub-layer 620 may be strip structures, as shown in FIG. 13.

It is to be noted that the color of the first color resist sub-layer 710 is different from the color of the second color resist sub-layer 720. Accordingly, the overlapping region P between the first color resist sub-layer 710 and the second color resist sub-layer 720 has a function of light-blocking, which can prevent the second metal wires 230 covered by the overlapping region P from leaking light at metal, and thus enhance the display effect of the display panel.

It is to be noted that the first color resist sub-layer 710 and the second color resist sub-layer 720 are disposed in the first color resist layer 110 and the second color resist layer 210 respectively. Accordingly, it is unnecessary to provide dedicated layers for the first color resist sub-layer 710 and the second color resist sub-layer 720, thereby avoiding an increase in a number of layers of the display panel and facilitating the design of a thin display panel.

For example, the color of the first color resist sub-layer 710 and the color of the second color resist sub-layer 720 may be each either red or blue and are different from each other. Accordingly, the overlapping region P between the first color resist sub-layer 710 and the second color resist sub-layer 720 has a good function of light-blocking, thus enhancing the avoidance of the light leakage at metal.

Figure 15:
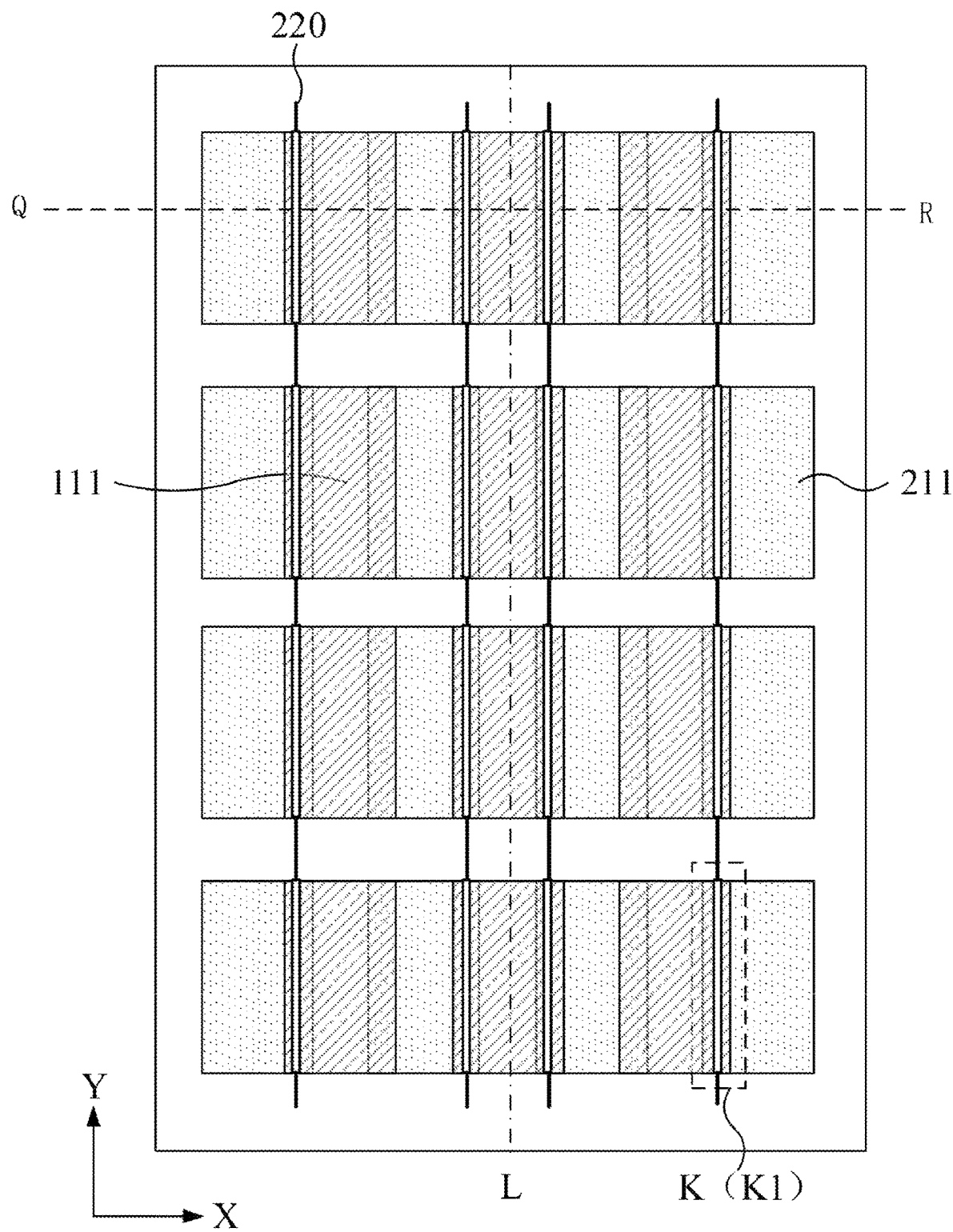
FIG. 15 is a top view illustrating a structure of a display panel according to another embodiment of the present application.
Figure 16:
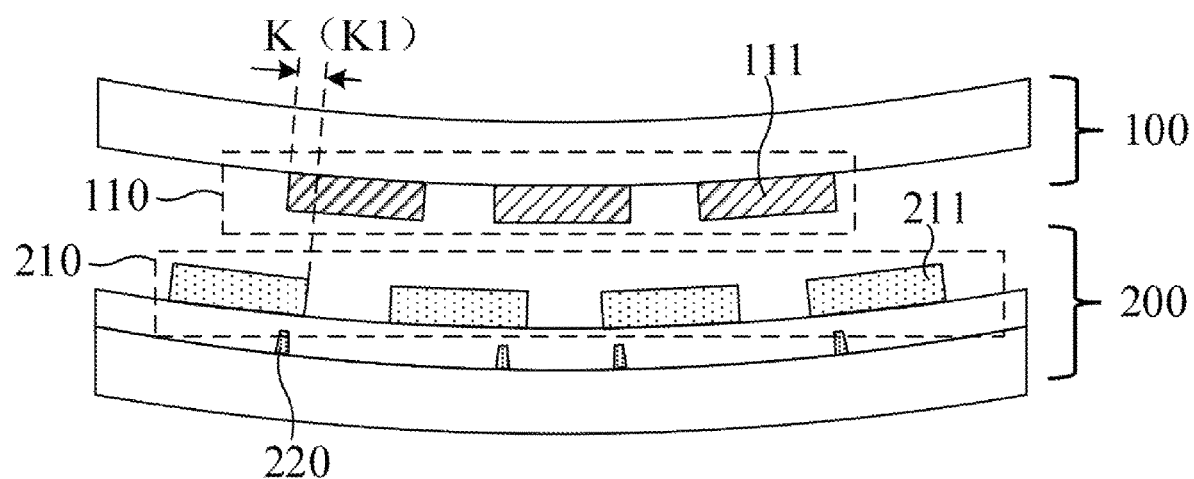
FIG. 16 is a section view taken along dashed line QR of FIG. 15.

FIG. 15 is a top view illustrating a structure of a display panel according to another embodiment of the present application. FIG. 16 is a section view taken along dashed line QR of FIG. 15. As shown in FIGS. 15 and 16, the display panel is bent around a bend axis L toward the color film substrate 100. The overlapping regions K between the plurality of second-type color resist blocks 211 and the plurality of first-type color resist blocks 111 closer to the bend axis L and disposed at two sides of the plurality of second-type color resist blocks 211 are first overlapping regions K1. The first overlapping regions K1 cover the plurality of first metal wires 220.

It is to be noted that the display panel is bent around the bend axis L toward the color film substrate 100. When the display panel is converted from a planar arrangement into a bent arrangement, the array substrate 200 is shifted toward a side facing the bend axis L relative to the color film substrate 100. The widths of the overlapping regions K other than the first overlapping regions K1 are relatively small. Part of the first metal wires 220 covered by the display panel in the planar arrangement is exposed along with the bending of the display panel. However, the widths of the first overlapping regions K1 in the second direction X are increased. The first metal wires 220 covered by the display panel in the planar arrangement would keep being covered by the first overlapping regions K1. Accordingly, the first overlapping regions K1 is configured to cover the first metal wires 220 to ensure that light leakage at metal would never happen at the first metal wires 220 during the bending process of the display panel.

Figure 17:
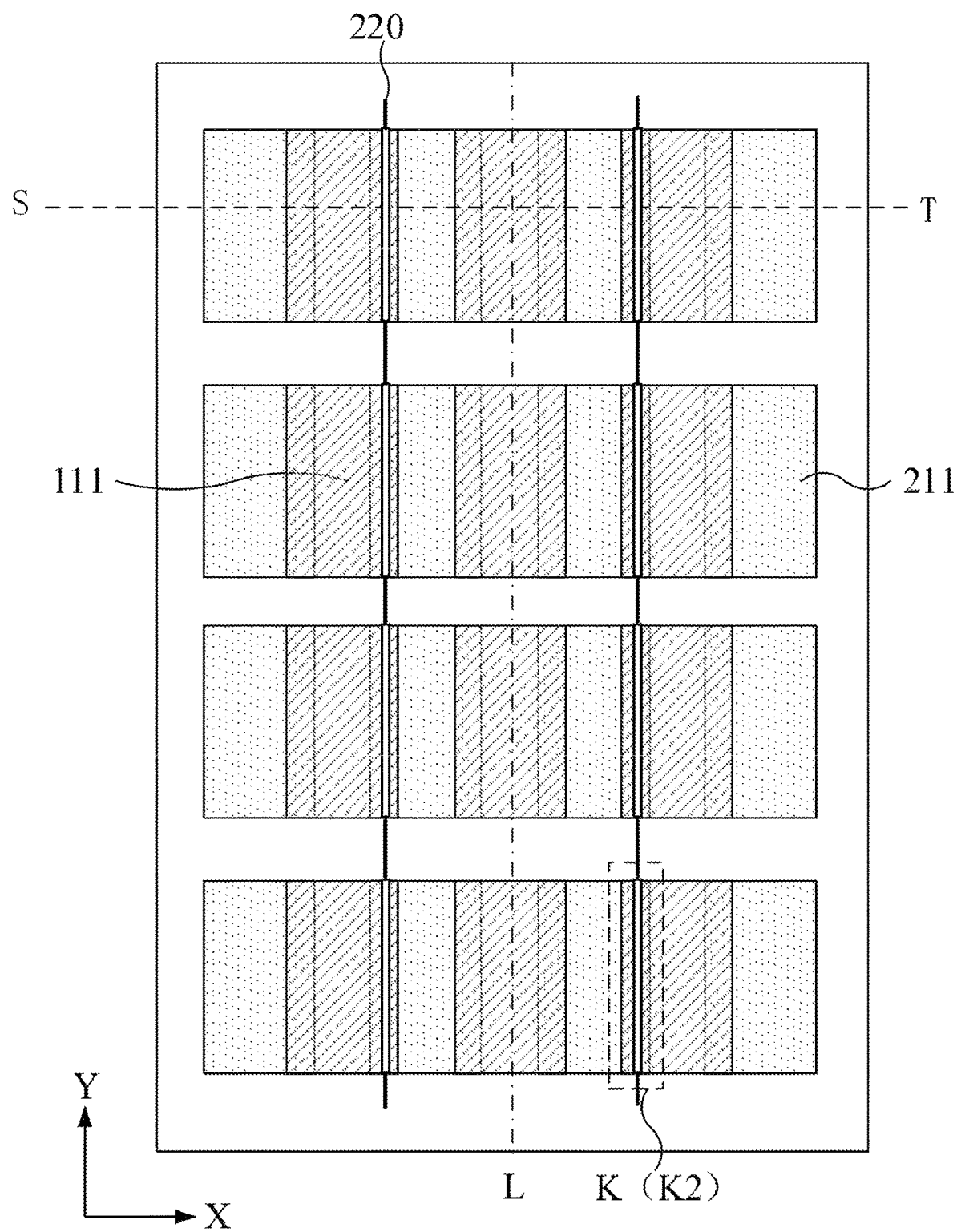
FIG. 17 is a top view illustrating a structure of a display panel according to another embodiment of the present application.
Figure 18:
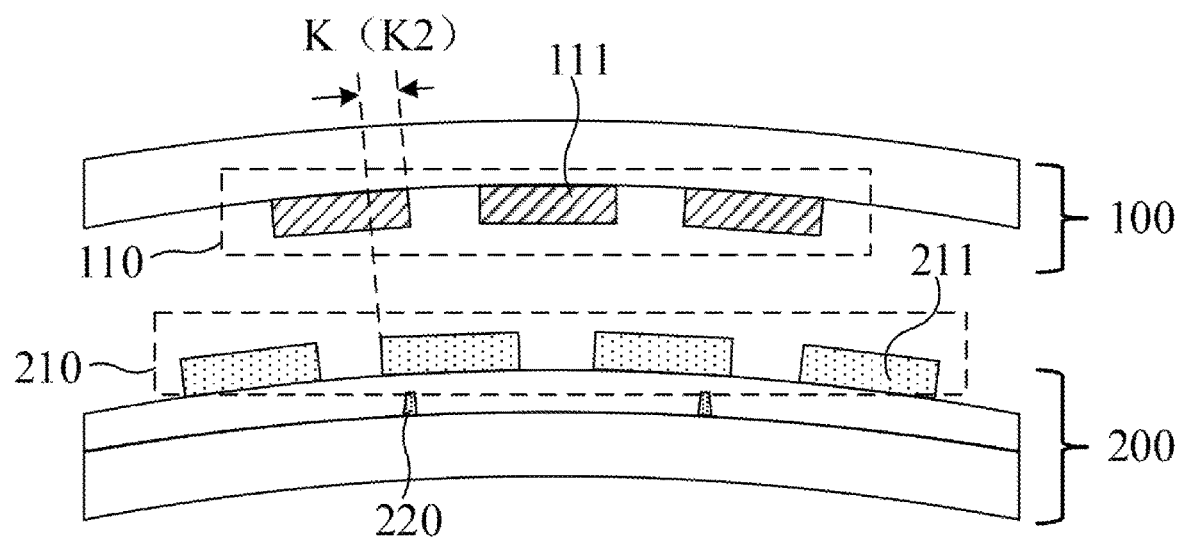
FIG. 18 is a section view taken along dashed line ST of FIG. 17.

FIG. 17 is a top view illustrating a structure of a display panel according to another embodiment of the present application. FIG. 18 is a section view taken along dashed line ST of FIG. 17. As shown in FIGS. 17 and 18, the display panel is bent along the bend axis L toward the array substrate 200. The overlapping regions K between the second-type color resist blocks 211 and the first-type color resist blocks 111 on a side facing away from the bend axis L and disposed at two sides of the plurality of second-type color resist blocks 211 are second overlapping regions K2. The second overlapping regions K2 cover the plurality of first metal wires 220.

It is to be noted that the display panel is bent around the bend axis L toward the color film substrate 100. When the display panel is converted from a planar arrangement into a bent arrangement, the array substrate 200 is shifted toward a side facing the bend axis L relative to the color film substrate 100. The widths of the overlapping regions K other than the first overlapping regions K2 are relatively small.

Part of the first metal wires 220 covered by the display panel in the planar arrangement is exposed along with the bending of the display panel. However, the widths of the first overlapping regions K2 in the second direction X are increased. The first metal wires 220 covered by the display panel in the planar arrangement would keep being covered by the first overlapping regions K2. Accordingly, the first overlapping regions K2 is configured to cover the first metal wires 220 to ensure that light leakage at metal would never happen at the first metal wires 220 during the bending process of the display panel.

Figure 19:
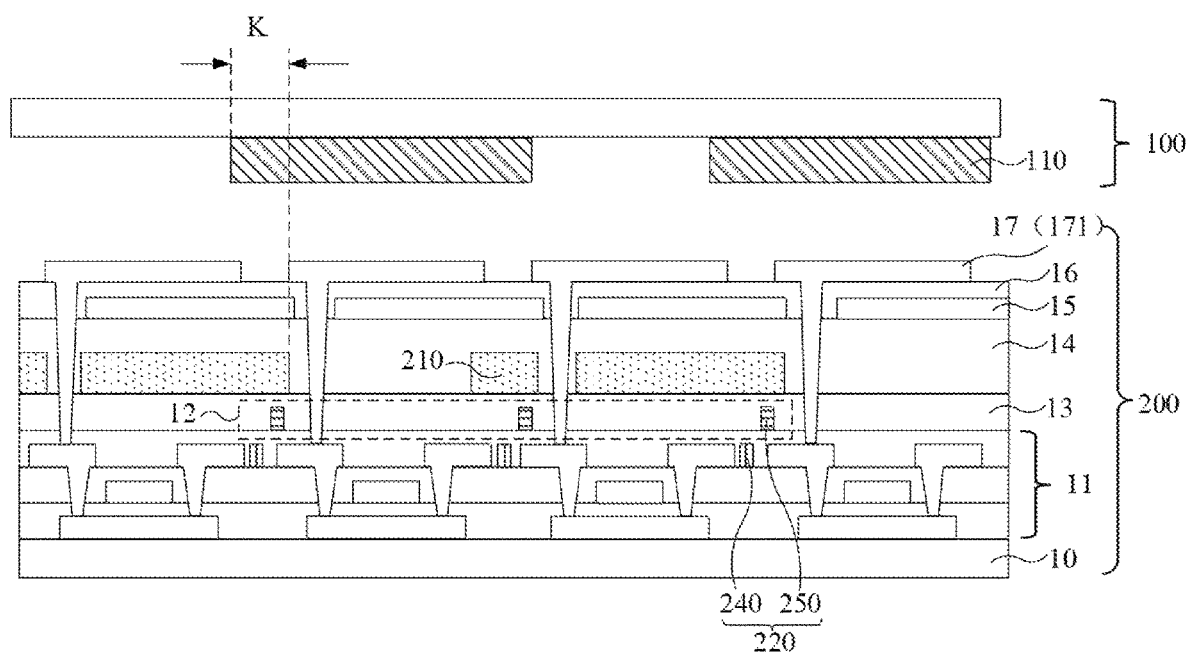
FIG. 19 is a section view illustrating a structure of part of a display panel according to an embodiment of the present application.

FIG. 19 is a section view illustrating a structure of part of a display panel according to an embodiment of the present application. As shown in FIG. 19, the array substrate 200 further includes a base substrate 10, and a switch element layer 11, a touch signal line layer 12, a first passivation layer 13, a planarization layer 14, a common electrode layer 15, a second passivation layer 16, and a pixel electrode layer 17 that are formed in sequence on the base substrate 10 in sequence. The plurality of data lines 240 are disposed in the switch element layer 11. The plurality of touch signal lines 250 are disposed in the touch signal line layer 12. The second color resist layer 210 is disposed between the first passivation layer 13 and the planarization layer 14.

For example, as shown in FIG. 19, the plurality of first metal wires 220 may include the plurality of data lines 240 and the plurality of touch signal lines 250.

It is to be noted that FIG. 19 illustrates only the sectional structure of a partial region of very small size in the display panel. The bending degree thereof tends to be zero. In this embodiment, the relatively small bending degree is ignored and an exemplary description is made in which each layer is in a planar arrangement.

It is to be further noted that a thickness of the planarization layer 14 is greater than thicknesses of other layers. In this embodiment, the second color resist layer 210 is covered by the planarization layer 14, which provides a planar deposition surface for layers including the common electrode layer 15 on one hand, and facilitates the design of a thin display panel on the other hand, as the second color resist layer 210 is disposed inside the planarization layer 14 so that the entire thickness of the two is equal to the thickness of the planarization layer 14.

Additionally, referring to FIG. 19, the pixel electrode layer 17 includes a plurality of pixel electrode blocks 171. The pixel electrode blocks 171 are disposed in a one-to-one correspondence with the color resist blocks (the color resist blocks include color resist blocks both in the first color resist layer 110 and the second color resist layer 210). During a normal display process of the display panel, the pixel electrode blocks 171 have slits. An electric field is formed by applying voltages to the pixel electrode blocks 171 and the common electrode layer 15. Liquid crystal molecules in the liquid crystal layer (not shown) disposed between the color film substrate 100 and the array substrate 200 are deflected under the action of the electric field, to adjust the luminous flux of incident light from a backlight source (not shown). The adjusted light passes through corresponding color resist blocks to implement displaying an image.

On the other hand, the touch signal line layer 12 includes a plurality of touch signal lines. The plurality of touch signal lines are configured to provide touch signals for touch electrodes so that a touch function of the touch electrodes is implemented normally. For example, the touch electrodes may be self-capacitance touch electrodes or mutual-capacitance touch electrodes, which is not limited in this embodiment and may be provided reasonably according to practical requirements.

It is to be noted that in FIGS. 1 to 19, illustrations are made only by taking an example in which the display panel includes the color resist blocks arranged in N rows and M columns, where N is 4. M is 8 or 7. A total number of color resist blocks in the display panel is not limited in this embodiment.

Figure 20:
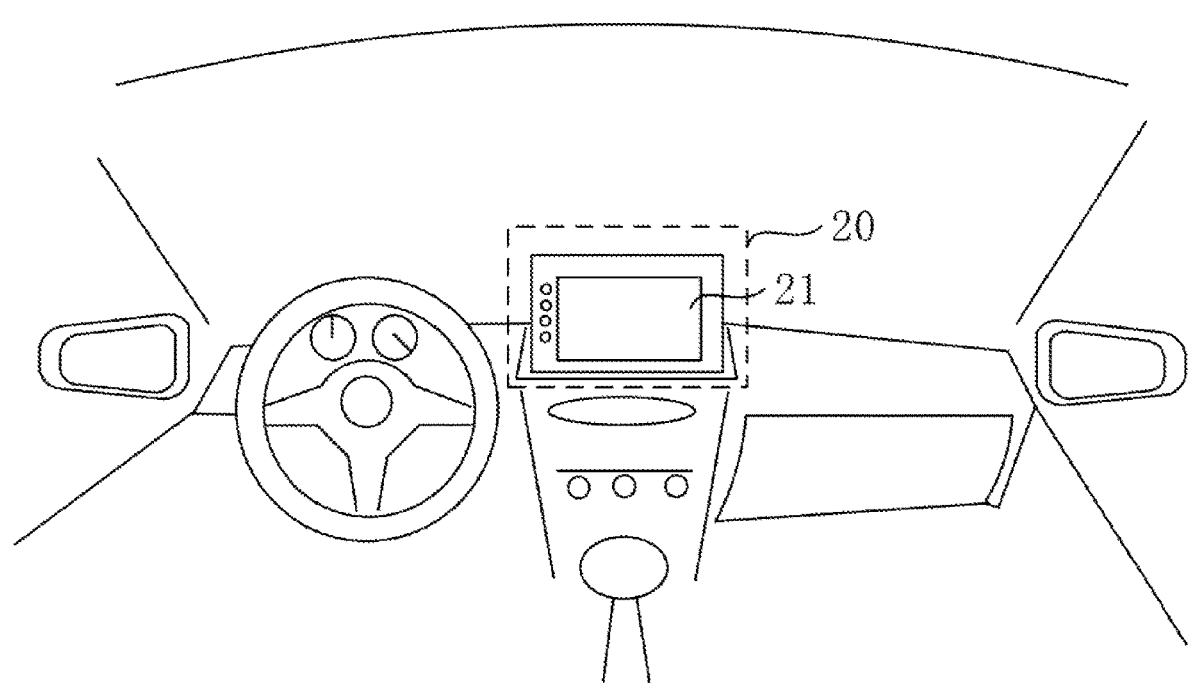
FIG. 20 is a view illustrating a structure of part of a vehicle according to an embodiment of the present application.

An embodiment of the present application further provides a display device. The display device 20 may include the display panel 21 provided in any one of embodiments of the present application. For example, as shown in FIG. 20, the display device 20 may be used as a vehicle-mounted display screen.

What is claimed is:

1. A display panel, comprising:
   a color film substrate and an array substrate disposed opposite to each other;
   a first color resist layer disposed on the color film substrate and comprising a plurality of first-type color resist blocks; and
   a second color resist layer and a plurality of first metal wires, wherein the second color resist layer and the plurality of first metal wires are disposed on the array substrate, wherein the second color resist layer is disposed on a side of the plurality of first metal wires facing the color film substrate, wherein the plurality of first metal wires extend along a first direction, wherein the second color resist layer comprises a plurality of second-type color resist blocks, wherein a color of the plurality of second-type color resist blocks is different from a color of the plurality of first-type color resist blocks, wherein each first-type color resist block of the plurality of first-type color resist blocks and each second-type color resist block of the plurality of second-type color resist blocks are disposed alternatively along a second direction, wherein an edge of the each first-type color resist block overlaps an edge of the each second-type color resist block adjacent to the each first-type color resist block, wherein overlapping regions between the plurality of first-type color resist blocks and the plurality of second-type color resist blocks that are adjacent to each other cover the plurality of metal wires, wherein
   the first direction is an extension direction of a bend axis of the display panel, and the second direction is perpendicular to the first direction.

2. The display panel of claim 1, wherein the plurality of first-type color resist blocks comprise a plurality of first color resist blocks, wherein the plurality of second-type color resist blocks comprise a plurality of second color resist blocks, and wherein the plurality of first-type color resist blocks or the plurality of second-type color resist blocks further comprise a plurality of third color resist blocks,
   wherein a color of each the plurality of first color resist blocks, a color of each the plurality of second color resist blocks, and a color of each the plurality of third color resist blocks are one of red, green, or blue and are different from each other.

3. The display panel of claim 2, wherein the color of each of the plurality of first color resist blocks and the color of each of the plurality of second color resist blocks are either red or blue and are different from each other.

4. The display panel of claim 2, wherein the plurality of second-type color resist blocks comprise the plurality of third color resist blocks, wherein the plurality of first color resist blocks, the plurality of second color resist blocks, and the plurality of third color resist blocks form a plurality of color resist groups, wherein the plurality of color resist groups are arranged in a first matrix, wherein a row direction of the first matrix is same as the second direction, and wherein a column direction of the first matrix is same as the first direction; and wherein each color resist group of the plurality of color resist groups comprises one of the plurality of first color resist blocks, one of the plurality of second color resist blocks, and one of the plurality of third color resist blocks; wherein the one of the plurality of second color resist blocks and the one of the plurality of third color resist blocks are disposed along the first direction; and along the second direction, wherein the one of the plurality of first color resist blocks is disposed on a side of the one of the plurality of second color resist blocks and the one of the plurality of third color resist blocks.

5. The display panel of claim 4, wherein in the each color resist group, an area of an aperture region of the one of the plurality of first color resist blocks, an area of an aperture region of the one of the plurality of second color resist blocks, and an area of an aperture region of the one of the plurality of third color resist blocks are equal.

6. The display panel of claim 2, wherein the plurality of second-type color resist blocks comprise the plurality of third color resist blocks;

wherein the plurality of first color resist blocks, the plurality of second color resist blocks, and the plurality of third color resist blocks form a plurality of color resist groups, wherein the plurality of color resist groups are arranged in a second matrix; wherein each color resist group of the plurality of color resist groups comprises four first color resist blocks of the plurality of first color resist blocks, two second color resist blocks of the plurality of second color resist blocks, and two third color resist blocks of the plurality of third color resist blocks, wherein the four first color resist blocks, the two second color resist blocks, and the two third color resist blocks are arranged in a third matrix; and wherein a row direction of the second matrix and a row direction of the third matrix are both same as the second direction, and wherein a column direction of the second matrix and a column direction of the third matrix are both same as the first direction;

wherein the four first color resist blocks comprise a first block of first color resist block, a second block of first color resist block, a third block of first color resist block, and a fourth block of first color resist block; wherein the two second color resist blocks comprise a first block of second color resist block and a second block of second color resist block; and the two third color resist blocks comprise a first block of third color resist block and a second block of third color resist block; and wherein in a first row of the third matrix, the first block of second color resist block, the first block of first color resist block, the first block of third color resist block, and the second block of first color resist block are disposed in sequence; and wherein in a second row of the third matrix, the third block of first color resist block, the second block of third color resist block, the fourth block of first color resist block, and the second block of second color resist block are disposed in sequence.

7. The display panel of claim 6, wherein an area of an aperture region of each second color resist block of the plurality of second color resist blocks and an area of an aperture region of each third color resist block of the plurality of third color resist blocks have a first value, and an area of an aperture region of each first color resist block of the plurality of first color resist blocks has one half of the first value.

8. The display panel of claim 1, further comprising:
a plurality of second metal wires disposed on the array substrate and a black matrix layer disposed on the color film substrate, wherein the plurality of second metal wires extend along the second direction, and the black matrix layer covers the plurality of second metal wires.

9. The display panel of claim 1, further comprising:
a plurality of second metal wires disposed on the array substrate, a first color resist sub-layer disposed in the first color resist layer, and a second color resist sub-layer disposed in the second color resist layer, wherein the plurality of second metal wires extend along the second direction, and a color of the first color resist sub-layer is different from a color of the second color resist sub-layer; and
wherein an overlapping region between the first color resist sub-layer and the second color resist sub-layer covers the plurality of second metal wires.

10. The display panel of claim 9, wherein the color of the first color resist sub-layer and the color of the second color resist sub-layer are each either red or blue and are different from each other.

11. The display panel of claim 1, wherein the display panel is bent around a bend axis of the display panel and toward the color film substrate; and
wherein the overlapping regions between the plurality of second-type color resist blocks and the plurality of first-type color resist blocks closer to a side of the bend axis and disposed at two sides of the plurality of second-type color resist blocks are first overlapping regions, and wherein the first overlapping regions cover the plurality of first metal wires.

12. The display panel of claim 1, wherein the display panel is bent around a bend axis of the display panel and toward the array substrate; and
wherein the overlapping regions between the plurality of second-type color resist blocks and the plurality of first-type color resist blocks facing away from a side of the bend axis L and disposed at two sides of the plurality of second-type color resist blocks are second overlapping regions, wherein the second overlapping regions cover the plurality of first metal wires.

13. The display panel of claim 1, wherein the plurality of first metal wires comprise a plurality of data lines and a plurality of touch signal lines.

14. The display panel of claim 13, wherein the array substrate further comprises a base substrate, a switch element layer, a touch signal line layer, a first passivation layer, a planarization layer, a common electrode layer, a second passivation layer, and a pixel electrode layer that are formed in sequence on the base substrate, wherein the plurality of data lines are disposed in the switch element layer, wherein the plurality of touch signal lines are disposed in the touch signal line layer; and
wherein the second color resist layer is disposed between the first passivation layer and the planarization layer.

15. A display device, comprising a display panel, wherein the display panel comprises:

a color film substrate and an array substrate disposed opposite to each other;

a first color resist layer disposed on the color film substrate and comprising a plurality of first-type color resist blocks; and a second color resist layer and a plurality of first metal wires, wherein the second color resist layer and the plurality of first metal wires are disposed on the array substrate, wherein the second color resist layer is disposed on a side of the plurality of first metal wires facing the color film substrate, wherein the plurality of first metal wires extend along a first direction, wherein the second color resist layer comprises a plurality of second-type color resist blocks, wherein a color of the plurality of second-type color resist blocks is different from a color of the plurality of first-type color resist blocks, wherein each first-type color resist block of the plurality of first-type color resist blocks and each second-type color resist block of the plurality of second-type color resist blocks are disposed alternatively along a second direction, wherein an edge of the each first-type color resist block overlaps an edge of the each second-type color resist block adjacent to the each first-type color resist block, wherein overlapping regions between the plurality of first-type color resist blocks and the plurality of second-type color resist blocks that are adjacent to each other cover the plurality of metal wires, wherein the first direction is an extension direction of a bend axis of the display panel, and the second direction is perpendicular to the first direction.

16. The display device of claim 15, wherein the plurality of first-type color resist blocks comprise a plurality of first color resist blocks, wherein the plurality of second-type color resist blocks comprise a plurality of second color resist blocks, and wherein the plurality of first-type color resist blocks or the plurality of second-type color resist blocks further comprise a plurality of third color resist blocks, wherein a color of each the plurality of first color resist blocks, a color of each the plurality of second color resist blocks, and a color of each the plurality of third color resist blocks are one of red, green, or blue and are different from each other.

17. The display device of claim 16, wherein the color of each of the plurality of first color resist blocks and the color of each of the plurality of second color resist blocks are either red or blue and are different from each other.

18. The display device of claim 16, wherein the plurality of second-type color resist blocks comprise the plurality of third color resist blocks, wherein the plurality of first color resist blocks, the plurality of second color resist blocks, and the plurality of third color resist blocks form a plurality of color resist groups, wherein the plurality of color resist groups are arranged in a first matrix, wherein a row direction of the first matrix is same as the second direction, and wherein a column direction of the first matrix is same as the first direction; and wherein each color resist group of the plurality of color resist groups comprises one of the plurality of first color resist blocks, one of the plurality of second color resist blocks, and one of the plurality of third color resist blocks; wherein the one of the plurality of second color resist blocks and the one of the plurality of third color resist blocks are disposed along the first direction; and along the second direction, wherein the one of the plurality of first color resist blocks is disposed on a side of the one of the plurality of second color resist blocks and the one of the plurality of third color resist blocks.

19. The display device of claim 18, wherein in the each color resist group, an area of an aperture region of the one of the plurality of first color resist blocks, an area of an aperture region of the one of the plurality of second color resist blocks, and an area of an aperture region of the one of the plurality of third color resist blocks are equal.

20. The display device of claim 16, wherein the plurality of second-type color resist blocks comprise the plurality of third color resist blocks;

wherein the plurality of first color resist blocks, the plurality of second color resist blocks, and the plurality of third color resist blocks form a plurality of color resist groups, wherein the plurality of color resist groups are arranged in a second matrix; wherein each color resist group of the plurality of color resist groups comprises four first color resist blocks of the plurality of first color resist blocks, two second color resist blocks of the plurality of second color resist blocks, and two third color resist blocks of the plurality of third color resist blocks, wherein the four first color resist blocks, the two second color resist blocks, and the two third color resist blocks are arranged in a third matrix; and wherein a row direction of the second matrix and a row direction of the third matrix are both same as the second direction, and wherein a column direction of the second matrix and a column direction of the third matrix are both same as the first direction;

wherein the four first color resist blocks comprise a first block of first color resist block, a second block of first color resist block, a third block of first color resist block, and a fourth block of first color resist block; wherein the two second color resist blocks comprise a first block of second color resist block and a second block of second color resist block; and the two third color resist blocks comprise a first block of third color resist block and a second block of third color resist block; and wherein in a first row of the third matrix, the first block of second color resist block, the first block of first color resist block, the first block of third color resist block, and the second block of first color resist block are disposed in sequence; and wherein in a second row of the third matrix, the third block of first color resist block, the second block of third color resist block, the fourth block of first color resist block, and the second block of second color resist block are disposed in sequence.

* * * * *